Aug. 3, 1954　　　　　L. M. DAVIS　　　　　2,685,484
SPACER AND EXPANDER FOR PISTON RINGS
Filed Aug. 14, 1953

INVENTOR.
LEWIS M. DAVIS
BY
Frank E. Liverance, Jr.
ATTORNEY

Patented Aug. 3, 1954

2,685,484

UNITED STATES PATENT OFFICE 2,685,484

SPACER AND EXPANDER FOR PISTON RINGS

Lewis M. Davis, Muskegon, Mich., assignor to Sealed Power Corporation, Muskegon, Mich., a corporation of Michigan Application August 14, 1953, Serial No. 374,243

2 Claims. (Cl. 309—29)

This invention relates to and is concerned with piston rings and is more specifically directed to a novel, one-piece spacer and expander made from flat spring metal, in use located between upper and lower thin metallic rails in the oil groove of a piston.

Such oil grooves at their bottoms are vented to the interior of the piston for passage of oil, for returning it to the crankcase of the engine in which the piston is used. The oil is scraped and otherwise collected from the walls of the cylinder, preferably all excess being removed, and passes through the oil ring to the bottom of the piston ring groove and thence to the engine crankcase. Oil rings for efficient functioning must have free ventilation for passage of oil and also exert sufficient tension against the cylinder wall to scrape off excess oil. The one-piece oil ring is becoming unsatisfactory to control the oil salvaging particularly on present day high compression engines. Accordingly multiple piece oil rings are supplanting the old and conventional one-piece oil rings.

The multipiece rings in general consist of two thin side rails of flat metal, each in circular form with a parting gap at a side to allow passage over the piston in assembling in an oil groove. Two thin rails form each a ring side with a spacer between them to maintain ring width; and generally such assembly of rails and spacer has been backed up with a crimped expander between the inner edges of the thin rail members and the bottom of the ring groove for exertion of outward pressure against a cylinder wall. The bottom of the ring groove must support a crimped expander if used. It is now quite extensive practice that oil ring grooves in the pistons are cut through the walls of the piston, except at the wrist pin bosses, so that the ring grooves are open between said bosses. The long used crimped steel ribbon expander in such installations has nothing for it to bear against where, previously, it pressed against the bottom of the piston ring groove.

My invention is directed to a simple, novel, practical and effective combined spacer and expander, made in a simple manner and used between two thin metallic rails of a piston ring and formed to engage against said rails at their inner curved edges to force them outwardly and cause the outer curved edges of the rails to bear with the necessary unit pressure against the walls of a cylinder in which installed. With my invention, the material required is at a minimum, waste is very small, the steps undertaken to produce the spacer and expander are readily performed, all aiding in the economical manufacture of the combined ring and expander which I have invented.

An understanding of the invention may be had from the following description taken in connection with the accompanying drawing, in which, Fig. 1 is a fragmentary plan view showing the first step of producing the novel combined ring and expander of my invention.

Like reference characters refer to like parts in the different figures of the drawing.

Figure 1:
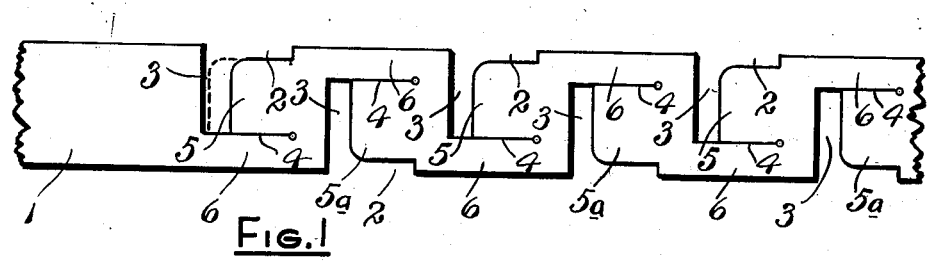
Figure 2:
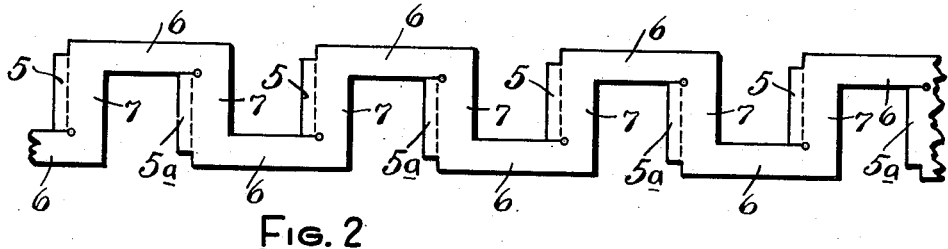
Fig. 2 is a similar view illustrating the second step in which tongues which are formed in the first step of the invention are bent outwardly at an angle to the body of said member.

The expander and spacer of my invention is made from a length of flat metallic ribbon material, preferably of spring steel, indicated at 1. By punch press and die operations, portions of the metal are cut away at the upper and lower edges and downwardly and upwardly from the upper and lower edges, alternately with each other as shown in Fig. 1. For example, at spaced intervals in the length of the ribbon 1, somewhat elongated sections 2 are cut away alternately both at the upper and lower edges thereof, joining with transverse slots 3 extending downwardly from the upper edges of the ribbon stock and upwardly from the lower edges thereof but terminating short from the lower and upper edges respectively, as shown. From the closed ends of the slots 3 the stock is slit horizontally, as at 4, a distance such that the ends of the slits 4 are vertically aligned with one of the ends of the removed portions at 2. This leaves tongues 5 and 5a alternately above and below horizontal sections 6 which are connected by vertical ties 7, the upper tongues 5 and the lower tongues 5a having integral connection each at one edge of the adjacent ties 7. As shown in Fig. 1 the length of the tongues 5 and 5a may be varied with a corresponding variation in the width of the slots 3.

Figure 3:
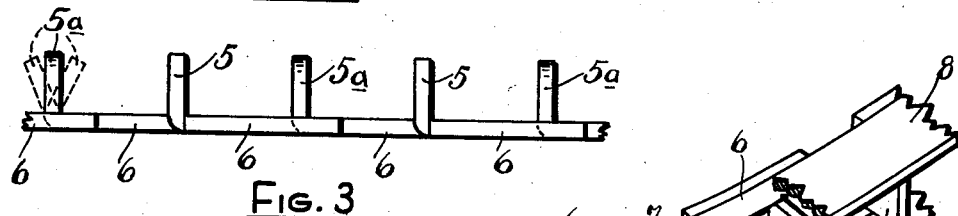
Fig. 3 is a fragmentary plan view of the expander and spacer of my invention after such tongues have been bent outwardly.
Figure 5:
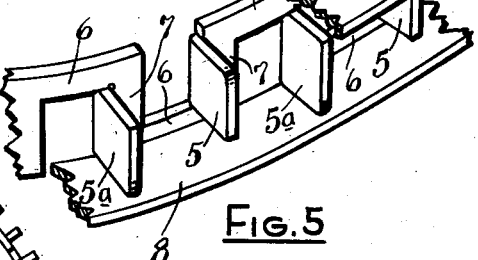
Fig. 5 is a fragmentary perspective view showing the steel rails assembled therewith.

The tongues 5 and 5a are bent outwardly. They may be located radially with respect to the circular member which is provided or they may be disposed at an angle to the radial position as in the dotted line indication thereof at one end of Fig. 3.

The flat thin steel rails 8 are used, one to lie against the upper edges of the tongues 5 and the other against the lower edges of the tongues 5a. It is apparent that the upper edges of the tongues 5 are located in the same plane which is a short distance above the upper edges of the plane of tongues 5a. The tongues 5a have their lower edges located in the same plane and lower than the plane of lower edges of the tongues 5. The rails rest upon the tongues 5 and 5a and at their inner edges come against the horizontal sections 6.

Figure 4:
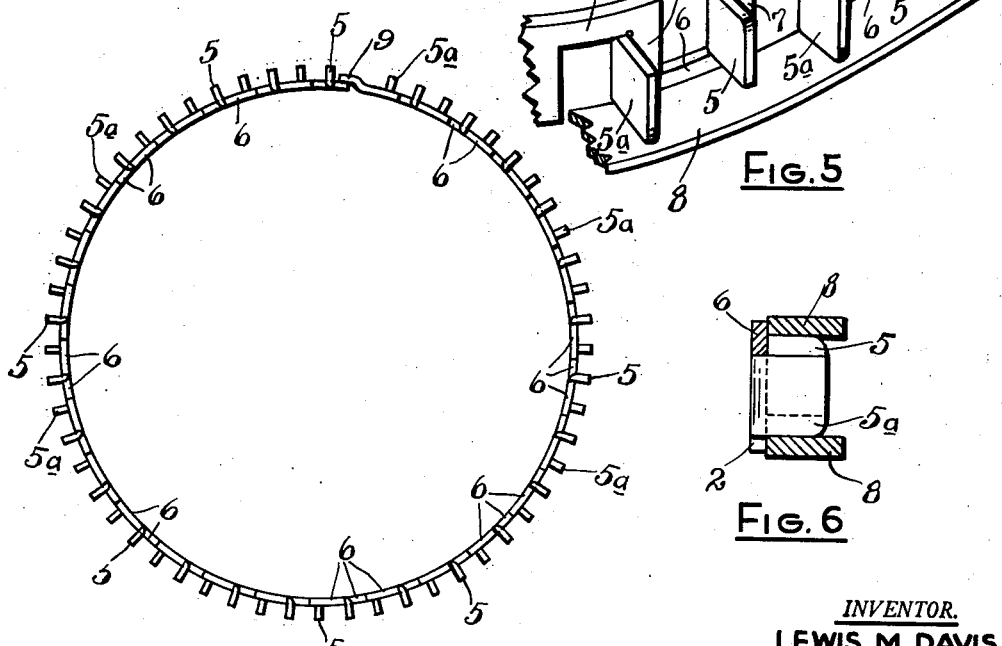
Fig. 4 is a plan view of the circular ring spacer and expander of the invention.
Figure 6:
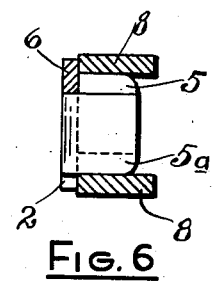
Fig. 6 is a transverse vertical section through the assembled rails, and the spacer and expander of my invention.

The thin steel rails are parted at one side as is conventional, and the combined expander and spacer is likewise parted. At one end at the parting the ribbon stock is offset outwardly a short distance and then extends over the adjacent end of said expander and spacer at the parting as shown at 9 (Fig. 4). The end of the section at 9 may come against the side of the adjacent outwardly extending tongue 5.

The circular, combined expander and spacer has a diameter such that when it is installed in a piston ring groove with the rails 8 assembled therewith, upon entering the piston ring into a cylinder the rails are contracted so as to be substantially closed at their partings while the expander and spacer are circumferentially compressed, the section 9 being against the adjacent tongue 5. The spacer and expander is shortened in length due to the corrugated form of the expander consisting of the alternate upper and lower sections 6 and connecting ties 7 between them. Force is required to compress the combined spacer and expander, thereby generating in it a resistance which tends to return such expander and spacer to its normal uncompressed and uncontracted position. This results in an outward radial pressure against the inner edges of the rails 8 so that at their outer curved edges they bear with a designed unit pressure against the cylinder wall. Therefore in use, upon reciprocation of the piston the outer curved edges of the rails 8 bearing against the cylinder wall serve to scrape and otherwise remove excess oil which is directed inwardly through the openings left by the tongues 5 and 5a in the expander and spacer and therefrom to the bottom of the piston ring groove and through its venting passages to the interior of the piston. The invention which I have made eliminates the previously used crimped steel ribbon expander. It may be used in ring grooves having both closed and open or partly open bottoms. Ventilation for the free passage of oil is present in excess of that required. The assembly of the piston ring is also facilitated.

The invention is defined in the appended claims and is to be considered comprehensive of all forms of structure coming within their scope.

I claim:

1. A circular parted, compressible spacer and expander for piston rings comprising, a length of thin, flat metallic material having successive horizontal sections alternately at upper and lower side edge portions thereof connected by vertical ties between ends of said sections, and tongues integral with said ties, one at a vertical edge of each thereof extending outwardly from said ties, alternate tongues thereof having upper edges in the same plane above the plane of the remaining tongues, and said remaining tongues having lower edges in the same plane below the plane of the lower edges of said first mentioned tongue.

2. A circular, parted compressible spacer and expander for piston rings comprising, a corrugated member of thin metallic material having successive corrugations open alternately at upper and lower sides of said member and closed opposite said open portions with integral ties connecting the ends of said closed sides of the corrugations, and tongues integral with said ties, one for each tie extending outwardly from said ties alternately above and below the closed ends of said corrugations, said spacer and expander having a parting in a side thereof, and one end thereof at said parting being offset outwardly and adapted to engage against the adjacent side of the tongue extending outwardly nearest said parting.

References Cited in the file of this patent

UNITED STATES PATENTS

| Number | Name | Date |
| --- | --- | --- |
| 2,345,176 | Bowers | Mar. 28, 1944 |